United States Patent [19]

Cooper, Sr.

[11] 4,130,312

[45] Dec. 19, 1978

[54] SECTIONED BREAKABLE VEHICULAR SAFETY BUMPER

[76] Inventor: Robert L. Cooper, Sr., P.O. Box 461, Clay City, Ky. 40312

[21] Appl. No.: 858,700

[22] Filed: Dec. 8, 1977

[51] Int. Cl.² .............................................. B60R 19/04
[52] U.S. Cl. .......................................... 293/76; 293/99
[58] Field of Search .................. 293/60, 70, 71 R, 78, 293/75–77, 79, 87, 88, 96, 99, 100, 89, 62–63, 95, 74, 91–93, 94, 98; 296/31 P

[56] References Cited

U.S. PATENT DOCUMENTS

| | | | |
|---|---|---|---|
| 2,954,256 | 9/1960 | Barényi | 293/76 X |
| 3,596,963 | 8/1971 | Phillips | 293/76 |
| 3,907,352 | 9/1975 | Spain et al. | 293/76 |

Primary Examiner—Trygve M. Blix
Assistant Examiner—Douglas C. Butler
Attorney, Agent, or Firm—Daniel Jay Tick

[57] ABSTRACT

A main metal bumper section is affixed to, and extends between, plates affixed to the front ends of the first and second spaced parallel structural members of the chassis of a motor vehicle. A first plastic bumper section is affixed to the plate of the first structural member and extends to one side of the main bumper section. A second plastic bumper section is affixed to the plate of the second structural member and extends to the opposite side of the main bumper section. The first, second and main bumper sections are aligned to provide a single bumper in appearance having a continuous front surface.

1 Claim, 2 Drawing Figures

SECTIONED BREAKABLE VEHICULAR SAFETY BUMPER

BACKGROUND OF THE INVENTION

The present invention relates to a safety bumper. More particularly, the invention relates to a safety bumper for a motor vehicle having a chassis with first and second spaced substantially parallel structural members extending along the length of the vehicle. Each of the structural members of the chassis has a front end.

Objects of the invention are to provide a safety bumper for a motor vehicle such as a truck, which bumper is of simple structure, inexpensive in manufacture, installed with facility, convenience and rapidity on new and existing motor vehicles, and functions efficiently, effectively and reliably to shear off at the ends rather than twist or distort the entire bumper and/or rip the entire bumper from the chassis, in the event of an accident wherein a side or end of the bumper is struck.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
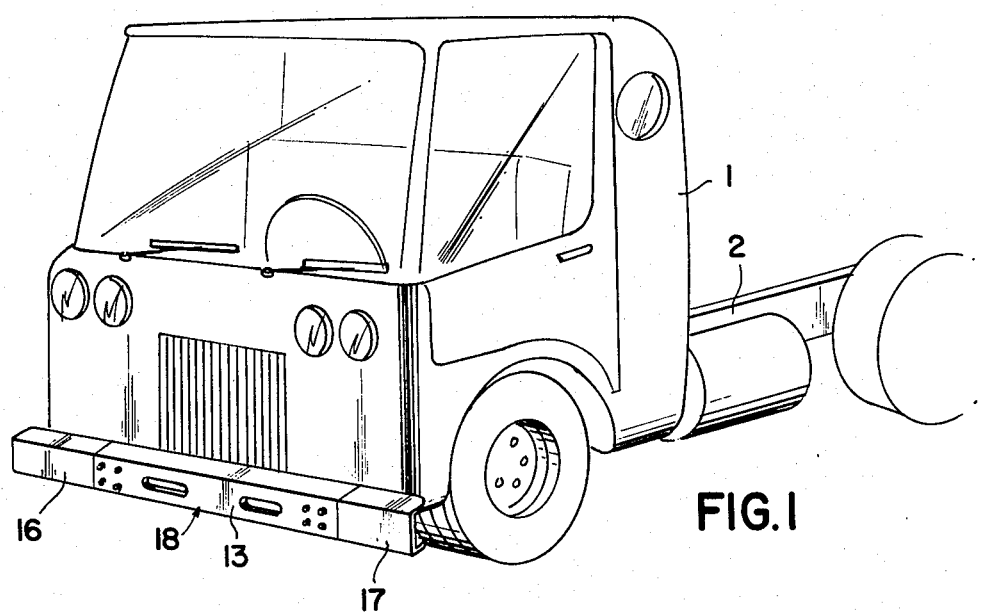
FIG. 1 is a perspective view of an embodiment of the safety bumper of the invention mounted on the front of a tractor truck.
Figure 2:
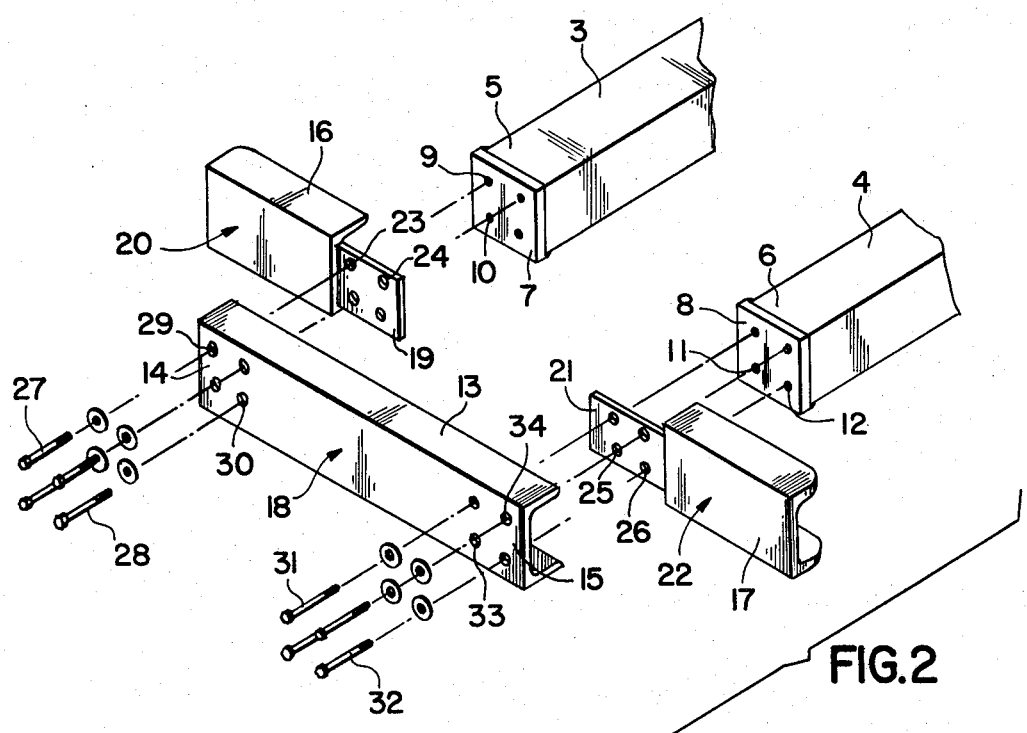
FIG. 2 is an exploded perspective view of the embodiment of FIG. 1.

The safety bumper of the invention is for a motor vehicle 1 having a chassis 2 (FIG. 1) with first and second spaced substantially parallel structural members 3 and 4 extending along the length of the vehicle, as shown in FIG. 2. The structural members 3 and 4 have front ends 5 and 6, respectively (FIG. 2).

The safety bumper of the invention comprises a pair of square plates 7 and 8 affixed to the front ends 5 and 6 of the first and second structural members 3 and 4, respectively, of the chassis, as shown in FIG. 2. Each of the plates 7 and 8 has a plurality of spaced holes 9, 10, and so on, and 11, 12, and so on, formed therethrough.

A main bumper section 13 of channel configuration having a substantially square U cross section is affixed to, and extends between, the plates 7 and 8 at the front ends of the first and second structural members 3 and 4, respectively (FIG. 2). The main bumper section comprises metal and preferably comprises steel. The main bumper section 13 has spaced opposite first and second ends 14 and 15 (FIG. 2). The first end 14 is bolted to the plate 7 of the first structural member 3 via the holes 9, 10, and so on, through said plate. The second end 15 of the main bumper section 13 is bolted to the plate 8 of the second structural member 4 via the holes 11, 12, and so on, through said plate.

The first plastic bumper section 16 is affixed to the plate 7 of the first structural member 3 and extends to one side of the main bumper section 13. A second plastic bumper section 17 is affixed to the plate 8 of the second structural member 4 and extends to the opposite side of the main bumper section 13. Each of the first and second plastic bumper sections is of channel configuration having a substantially square U cross section.

The first and second bumper sections 16 and 17 are the same and are aligned with the main bumper section 13 to provide a single bumper in appearance, as shown in FIG. 1, having a continuous front surface 18.

The first bumper section 16 has a tongue 19 extending therefrom behind the front surface 20 thereof. The second bumper section 17 has a tongue 21 extending therefrom behind the front surface 22 thereof. The tongues 19 and 21 have holes 23, 24, and so on, and 25, 26, and so on, formed therethrough, as shown in FIG. 2.

The first bumper section 16 is bolted to the plate 7 of the first structural member 3 via the tongue 19 thereof with the tongue positioned behind the front surface 18 of the main bumper section. This is accomplished by a plurality of bolts 27, 28, and so on, which are passed through the holes through the tongue 19, the first plate 7 and holes 29, 30, and so on, formed through the main bumper section at the first end thereof.

The second bumper section 17 is bolted to the plate 8 of the second structural member 4 via the tongue 21 behind the front surface 18 of the main bumper section 13. This is accomplished by a plurality of bolts 31, 32, and so on, which are passed through the holes through the tongue 21, the second plate 8 and holes 33, 34, and so on, formed through the main bumper section 13 at the second end thereof.

The safety bumper of the invention permits the driver of the vehicle equipped with it to have as much control of the steering of the vehicle as possible, in the event of an accident. The safety bumper helps eliminate the possibility of the front tires throwing stones or the like, forward, in the paths of oncoming vehicles on a two lane highway and to the rear of vehicles moving in front of the one with the safety bumper. The front bumper of the vehicle is still neat and enhances the appearance of the vehicle.

The safety bumper of the invention may be used on commercial vehicles, non-commercial vehicles, school buses, trucks, pickup trucks, tractor rigs, semi-tractors, campers, State vehicles, Government vehicles and any vehicles having very little clearance between the front tires and the front bumper.

Since there is very little change in commercial truck cab styles and bumpers and in other truck styles, there is no need to replace the entire bumper in order to install the safety bumper of the invention on a new truck. All that needs be done is to cut off the ends of the bumper on the vehicle, even and straight up and down with the outside of the frame. Then the main section of the bumper may be unbolted and the first and second safety bumper sections 16 and 17 may be slipped behind the main section and secured to the frame with said main section. This would cost considerably less than a new bumper.

While the invention has been described by means of a specific example and in a specific embodiment, I do not wish to be limited thereto, for obvious modifications will occur to those skilled in the art without departing from the spirit and scope of the invention.

I claim:

1. A safety bumper for a motor vehicle having a chassis with first and second spaced substantially parallel structural members extending along the length of the vehicle, each of the structural members of the chassis having a front end, said safety bumper comprising a pair of square plates each affixed to the front end of a corresponding one of the first and second structural members of the chassis and each of the plates having a plurality of spaced holes formed therethrough;

a main metal bumper section affixed to and extending between the plates at the front ends of the first and second structural members, said main metal bumper section having spaced opposite first and second ends, the first end being bolted to the plate of the first structural member via the holes through said plate of said first structural member and the second end being bolted to the plate of the second structural member via the holes through said plate of said second structural member;

a first plastic bumper section affixed to the plate of the first structural member and extending to one side of the main bumper section; and a second plastic bumper section affixed to the plate of the second structural member and extending to the opposite side of the main bumper section, the first and second bumper sections being the same and being aligned with the main bumper section to provide a single bumper in appearance having a continuous front surface, each of the first and second bumper sections having a tongue extending therefrom behind the front surface thereof, said tongues having holes formed therethrough, and said first and second bumper sections being bolted to the plates of the first and second structural members, respectively, via the tongues thereof, said tongues being positioned behind the front surface of said main bumper section.